(12) United States Patent
Okamura

(10) Patent No.: US 7,778,536 B2
(45) Date of Patent: Aug. 17, 2010

(54) DRIVING APPARATUS

(75) Inventor: Takashi Okamura, Kokubunji (JP)

(73) Assignee: Olympus Imaging Corp., Tokyo (JP)

( * ) Notice: Subject to any disclaimer, the term of this patent is extended or adjusted under 35 U.S.C. 154(b) by 220 days.

(21) Appl. No.: 12/163,320

(22) Filed: Jun. 27, 2008

(65) Prior Publication Data

US 2009/0003814 A1    Jan. 1, 2009

(30) Foreign Application Priority Data

Jun. 28, 2007    (JP) ............................ 2007-170968

(51) Int. Cl.
   G03B 17/00    (2006.01)
   H04N 5/228    (2006.01)
   G02B 27/64    (2006.01)

(52) U.S. Cl. .................. 396/55; 348/208.4; 348/208.7; 369/544

(58) Field of Classification Search .................. 396/55
   See application file for complete search history.

(56) References Cited

U.S. PATENT DOCUMENTS 7,324,748 B2 *   1/2008  Abe et al. ..................... 396/55

7,471,886 B2 *  12/2008  Hirota et al. ................... 396/52
2006/0113868 A1   6/2006  Sakatani et al.
2006/0133786 A1 *  6/2006  Teramoto ..................... 396/55
2006/0217491 A1   9/2006  Higashira et al.
2008/0100715 A1 *  5/2008  Chang et al. ............. 348/208.7

FOREIGN PATENT DOCUMENTS

CN    1777643    5/2006
CN    1780134    5/2006

* cited by examiner

*Primary Examiner*—Melissa J Koval
(74) *Attorney, Agent, or Firm*—Volpe and Koenig, P.C.

(57) ABSTRACT

An anti-vibration unit serving as a driving apparatus has an X axis transducer having a driver, a fixed frame having an X axis transducer holding part, an X frame having a sliding body against which the driver is pressed by a pressing plate with an anti-vibration sheet and a holder interposed therebetween, a Y axis transducer having a driver, and a Y frame having a sliding body against which the driver is pressed by the pressing plate with the anti-vibration sheet and the holder interposed therebetween. The anti-vibration sheet is narrower than the transducer, and grease is applied to one of the surfaces of the anti-vibration sheet and the pressing plate in contact with each other, so that the drivers are in proper contact with the sliding bodies, and the sliding bodies are efficiently driven. The driving apparatus is compact and produces high driving force with high efficiency.

5 Claims, 14 Drawing Sheets

Y AXIS DIRECTION

X AXIS DIRECTION

DRIVING APPARATUS

This application claims benefit of Japanese Application No. 2007-170968 filed in Japan on Jun. 28, 2007, the contents of which are incorporated herein by this reference.

BACKGROUND OF THE INVENTION

1. Field of the Invention

The present invention relates to a driving apparatus that moves a movable body (movable member) in a predetermined direction using an elliptic vibration of a transducer.

2. Description of the Related Art

Some conventional image pickup devices, such as cameras, have an anti-shake feature. A known anti-shake feature for cameras corrects blurring of an image on the image-pickup plane of the image pickup device by detecting a shake in the pitch direction and a shake in the yaw direction with shake detecting means, such as an angular velocity sensor, and shifting a part of the image pickup optical system or an image pickup device in a direction to cancel the shake independently in the horizontal direction and the vertical direction in a plane perpendicular to the photographing optical axis based on the signal indicative of the detected shake.

An anti-shake mechanism for implementing such an anti-shake feature has driving means for moving some of the photographing lenses or the image pickup device itself horizontally and vertically in the plane perpendicular to the photographing optical axis to compensate for the shake. The driving means has to be able to quickly respond to a shake, to precisely (finely) move a movable body, and to retain the position of the movable body even after power-off.

SUMMARY OF THE INVENTION

An object of the present invention is to provide a driving apparatus that can output high power by preventing the vibration of a transducer from damping due to an unwanted vibration and does not produce unwanted audible noise.

The present invention provides a driving apparatus, including: an actuator having a driver disposed on one surface of a piezoelectric device having a shape of a rectangular parallelepiped; a holding member that holds the actuator; a movable member that is moved on the holding member by the driver; a restricting member that restricts the position of the piezoelectric device with respect to the holding member; an anti-vibration sheet fixed to the restricting member; and a pressing member that presses the driver disposed on the actuator against the movable member with the restricting member and the anti-vibration sheet interposed therebetween, in which the restricting member has a protrusion that serves as a point of application of a pressing force of the pressing member at a center part in the longitudinal direction of the piezoelectric device having the shape of a rectangular parallelepiped, the anti-vibration sheet is fixed to the restricting member to cover the protrusion, and a low friction material is interposed between the anti-vibration sheet and the pressing member in the vicinity of the protrusion.

Furthermore, the present invention provides another driving apparatus, including: a transducer that produces an elliptic vibration on a driver in response to application of a periodic voltage at a predetermined frequency; a fixed member that has a holding part for holding the transducer; and a movable body that is driven and moved by the elliptic vibration of the transducer in a predetermined direction determined by a guiding part of the fixed member, the driver being pressed by a pressing member held by the fixed member pressing a pressing part of the transducer, in which a vibration damping sheet is fixed to the pressing part, and a low friction material is interposed between the vibration damping sheet and the pressing part.

Other characteristics and advantages of the present invention will be apparent from the following description.

DETAILED DESCRIPTION OF THE PREFERRED EMBODIMENTS

In the following, a driving apparatus and an image pickup apparatus according to an embodiment of the present invention will be described with reference to the drawings. The image pickup apparatus according to the embodiment incorporate a driving apparatus for compensating for a shake of an image pickup unit including an image pickup device that produces an image signal by photoelectric conversion, and the following description will be focused on a single lens reflex electronic camera (digital camera) with an interchangeable lens, for example. The present invention is not limited to the embodiment described below, and various variations can be made without departing from the spirit of the present invention.

First, a system configuration example of a camera incorporating a driving apparatus according to a first embodiment of the present invention will be described with reference to FIG. 1.

Figure 1:
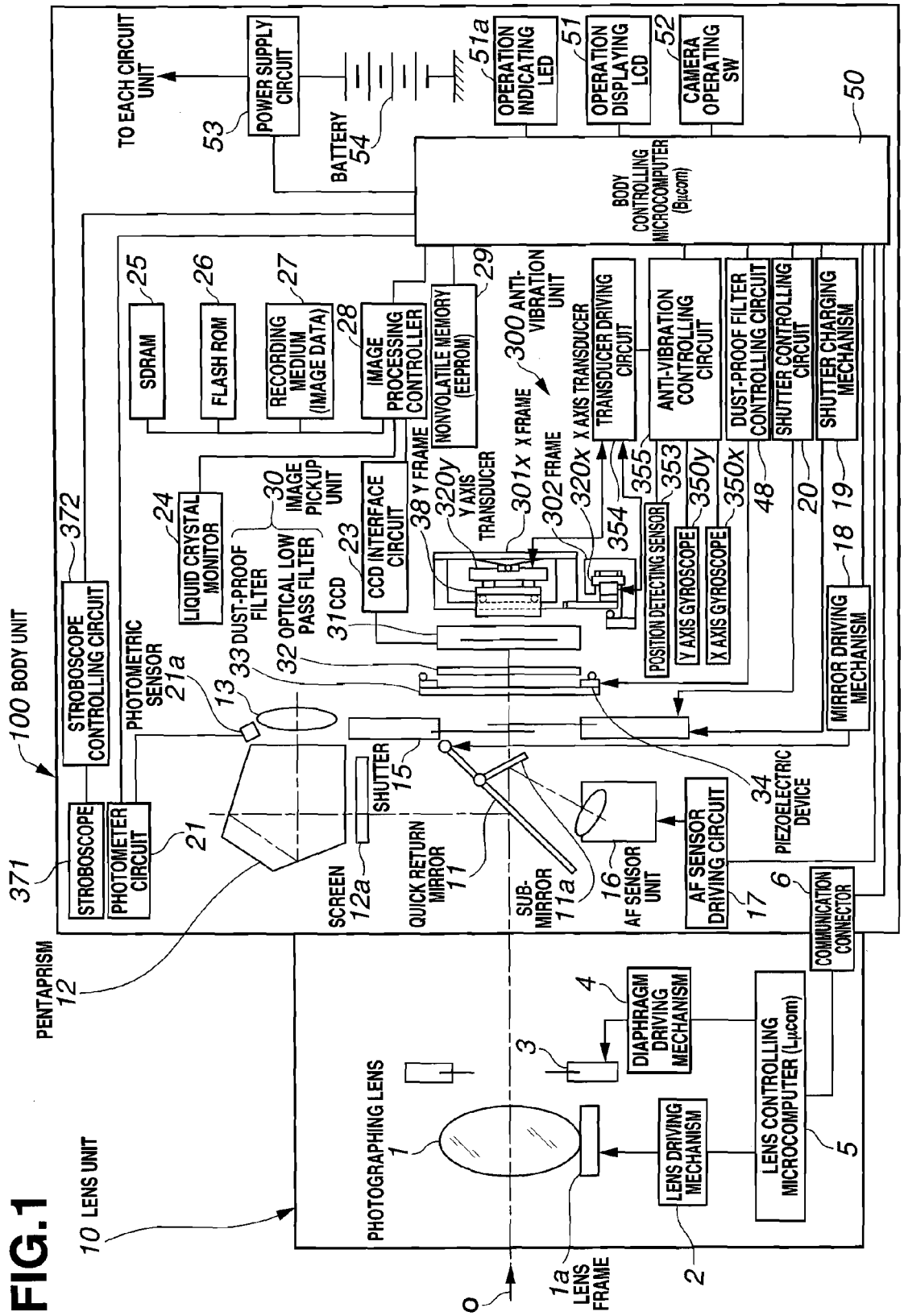
FIG. 1 is a schematic block diagram mainly showing an electrical system configuration of a camera incorporating a driving apparatus according to an embodiment of the present invention.

FIG. 1 is a schematic block diagram primarily showing an electrical system configuration of the camera according to the present embodiment.

The camera according to the present embodiment has a body unit 100 as a camera main body, and a lens unit 10 as an interchangeable lens, which is one of accessory devices.

The lens unit 10 can be attached to and detached from a lens mount (not shown) on the front surface of the body unit 100. The lens unit 10 is controlled by a lens controlling microcomputer (referred to as Lµcom hereinafter) 5 incorporated in the lens unit itself. The body unit 100 is controlled by a body controlling microcomputer (referred to as Bµcom hereinafter) 50. When the lens unit 10 is mounted on the body unit 100, the Lµcom 5 and the Bµcom 50 are electrically connected to each other via a communication connector 6 so that the Lµcom and the Bµcom can communicate with each other. Then, the Lµcom 5 and the Bµcom 50 cooperatively function as an integrated camera system in which the Lµcom 5 is subordinated to the Bµcom 50.

The lens unit 10 has a photographing lens 1 and a diaphragm 3. The photographing lens 1 is driven by a DC motor (not shown) in a lens driving mechanism 2. The diaphragm 3 is driven by a stepping motor (not shown) in a diaphragm mechanism 4. The Lµcom 5 controls the motors based on commands from the Bµcom 50.

In the body unit 100, the components described below are arranged as shown in the drawing, for example. Specifically, the optical system has single lens reflex components including a screen 12a, a pentaprism 12, a quick return mirror 11, an eyepiece 13 and a sub-mirror 11a, a focal-plane shutter 15 on the photographing optical axis, and an AF sensor unit 16 for determining the amount of defocus based on the reflected luminous flux from the sub-mirror 11a.

In addition, the body unit 100 incorporates an AF sensor driving circuit 17 that drives and controls the AF sensor unit 16, a mirror driving circuit 18 that drives and controls the quick return mirror 11, a shutter charging mechanism 19 that energizes springs for driving a front curtain and a rear curtain of the shutter 15, a shutter controlling circuit 20 that controls the movement of the front curtain and the rear curtain, and a photometer circuit 21 that carries out a photometric processing based on the luminous flux from the pentaprism 12 detected by a photometric sensor 21a. In addition, the body unit 100 incorporates a stroboscope 371 that emits light under the control of a stroboscope controlling circuit 372.

In addition, an image pickup unit 30 that carries out photoelectric conversion of a subject image having passed through the optical system described above is disposed on the photographing optical axis. The image pickup unit 30 is an integral unit having a CCD 31 as an image pickup device, an optical low pass filter (LPF) 32 disposed in front of the CCD 31, and a dust-proof filter 33. A piezoelectric device 34 is attached to the perimeter of the dust-proof filter 33.

The piezoelectric device 34 has two electrodes. Under the control of a dust-proof filter controlling circuit 48, the piezoelectric device 34 vibrates at a predetermined frequency to cause vibration of the dust-proof filter 33, thereby removing dust from the filter surface. An anti-vibration unit (driving apparatus) 300 for compensating for a shake described later is attached to the image pickup unit 30.

In the present embodiment, the camera system has a CCD interface circuit 23 connected to the CCD 31, a liquid crystal monitor 24 and an image processing controller 28 that carries out an image processing using an SDRAM 25 and a FLASH ROM 26 serving as a storage region. The camera system is configured to offer an electronic image pickup function and an electronic recording and displaying function.

A recording medium 27 is an external recording medium, such as various types of memory cards and external HDDs, and is removably attached to the camera main body by means of a communication connector so that the recording medium can communicate with the camera main body. The recording medium 27 stores image data acquired by photographing. In addition, a nonvolatile memory 29 that can be accessed by the Bμcom 50, such as an EEPROM, is provided as a storage region for storing a predetermined control parameter required for controlling the camera.

The Bμcom 50 has an operation displaying LCD 51 and an operation indicating LED 51a for visually informing a user of the operational state of the camera, and a camera operating switch group (in the following, a switch will be abbreviated as SW) 52. The camera operating SW group 52 includes operating buttons required for operating the camera, such as a release SW, a mode change SW and a power SW.

In addition, there are provided a battery 54 as a power supply and a power supply circuit 53 that converts the voltage of the battery 54 to a required voltage for each circuit unit of the camera system and supplies the required voltage to each circuit unit. In addition, there is provided a voltage detecting circuit that detects a voltage change that occurs when a current is supplied from an external power supply via a jack.

In general, the components of the camera system arranged as described above operate as described below. First, the image processing controller 28 controls the CCD interface circuit 23 according to a command from the Bμcom 50 to acquire image data from the CCD 31. The image processing controller 28 converts the image data into a video signal for display on the liquid crystal monitor 24. The user can confirm the photographed image through the image displayed on the liquid crystal monitor 24.

The SDRAM 25 is a memory for temporarily storing image data and is used as a work area for conversion of the image data. After the image data is converted into JPEG data, the JPEG data is stored in the recording medium 27.

The mirror driving mechanism 18 is a mechanism for driving the quick return mirror 11 to an up position and a down position. When the quick return mirror 11 is located at the down position, the luminous flux from the photographing lens 1 is divided into a luminous flux guided toward the AF sensor unit 16 and a luminous flux guided toward the pentaprism 12. The output of an AF sensor in the AF sensor unit 16 is transmitted to the Bμcom 50 via the AF sensor driving circuit 17, where a well-known ranging processing is carried out. On the other hand, part of the luminous flux passing through the pentaprism 12 is guided to the photometric sensor 21a in the photometer circuit 21, where a well-known photometric processing is carried out based on the amount of detected light.

Next, the image pickup unit 30 including the CCD 31 will be described with reference to FIG. 2.

Figure 2:
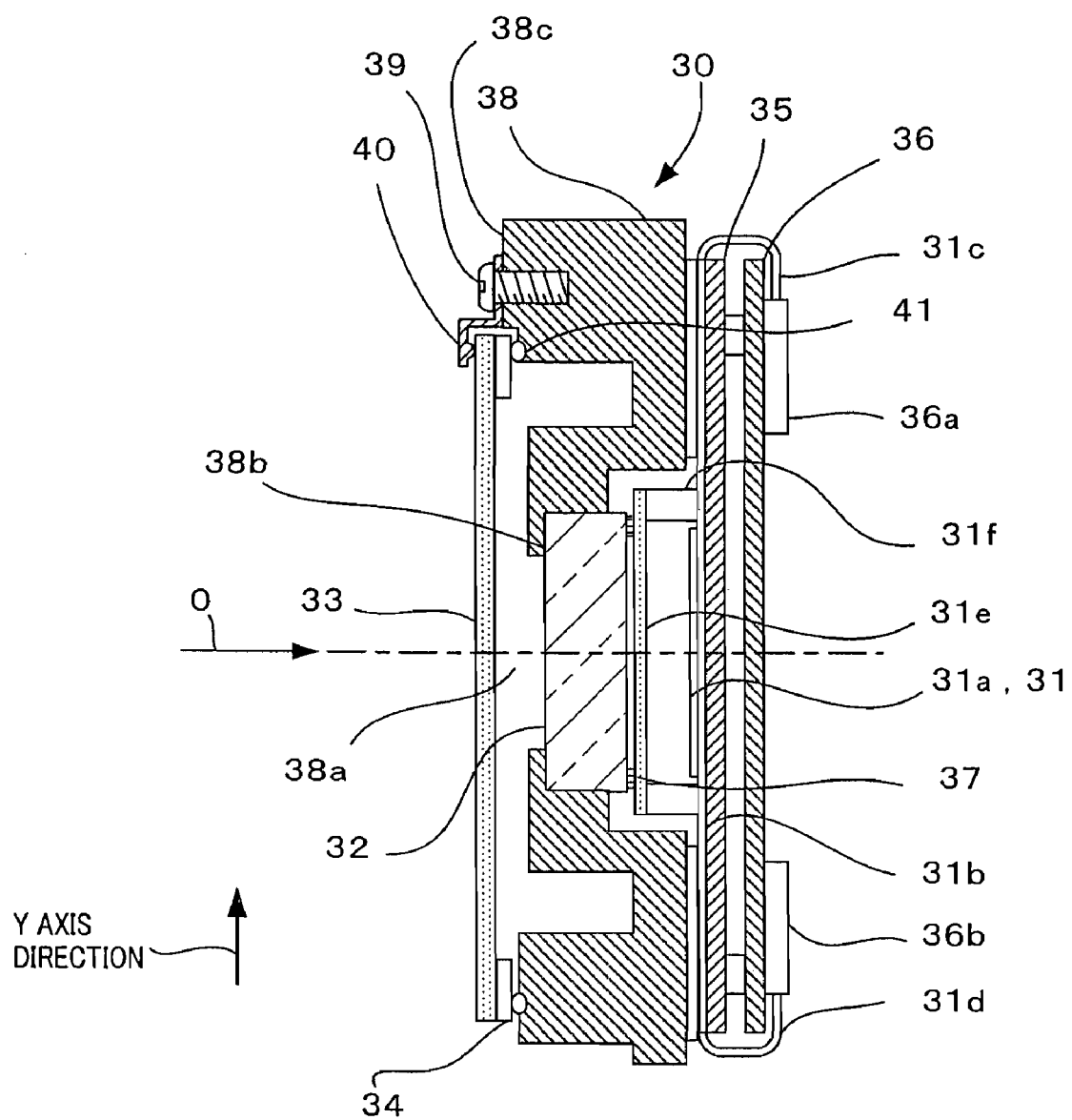
FIG. 2 is a vertical cross-sectional view showing a configuration of an image pickup unit incorporated in the camera shown in FIG. 1.

FIG. 2 is a vertical cross-sectional view showing a configuration of the image pickup unit 30.

The image pickup unit 30 has the CCD 31 that is an image pickup device that produces an image signal corresponding to light passing through the photographing optical system and applied to a photoelectric conversion plane thereof, the optical low pass filter (LPF) 32 that is disposed on the side of the photoelectric conversion plane of the CCD 31 for removing a high frequency component from the luminous flux from a subject passing through the photographing optical system and applied thereto, the dust-proof filter 33 disposed at a predetermined distance from the optical LPF 32 to oppose the front surface of the optical LPF 32, and the piezoelectric device 34 that is disposed at the perimeter of the dust-proof filter 33 for causing a predetermined vibration of the dust-proof filter 33.

A CCD chip 31a of the CCD 31 is directly mounted on a flexible substrate 31b disposed on a fixing plate 35, and connecting parts 31c and 31d extending from the opposite ends of the flexible substrate 31b are connected to a main circuit substrate 36 via connectors 36a and 36b on the main circuit substrate 36, respectively. The CCD 31 has a cover glass 31e, which is fixed to the flexible substrate 31b with a spacer 31f interposed therebetween.

In addition, a filter receiving member 37 formed by a resilient member or the like is disposed between the CCD 31 and the optical LPF 32. The filter receiving member 37 is positioned along the perimeter of the front surface of the CCD 31 to avoid interfering with the effective area of the photoelectric conversion plane of the CCD 31 and abuts against the rear surface of the optical LPF 32 in the vicinity of the perimeter of the optical LPF 32 so that the space between the CCD 31 and the optical LPF 32 is substantially hermetically sealed. In addition, a Y frame 38, which is a holder that hermetically covers the CCD 31 and the optical LPF 32, is provided.

The Y frame (holder) 38 has a rectangular opening 38a substantially at the center thereof on the photographing optical axis and a stepped part 38b that is substantially L-shaped in cross section formed along the inner perimeter of the opening 38a on the side of the dust-proof filter 33. At the rear of the opening 38a, the optical LPF 32 and the CCD 31 are disposed.

If the optical LPF 32 is disposed in such a manner that the perimeter of the front surface thereof substantially hermetically comes into contact with the stepped part 38b, the stepped part 38b restricts the position of the optical LPF 32 in the photographing optical axis direction, and the optical LPF 32 is prevented from dropping out of the Y frame (holder) 38 to the front thereof.

In addition, the Y frame (holder) 38 has, along the entire perimeter of the front surface thereof, a dust-proof filter receiving part 38c surrounding the stepped part 38b and protruding toward the front beyond the stepped part 38b for holding the dust-proof filter 33 in front of the optical LPF 32 at a predetermined distance from the optical LPF 32. The dust-proof filter 33 has the general shape of a circular or polygonal plate and is held by the dust-proof filter receiving part 38c in a state where the dust-proof filter 33 is pressed against the dust-proof filter receiving part 38c by a pressing member 40 formed by a resilient body, such as a plate spring, and fixed to the dust-proof filter receiving part 38c with a screw 39.

An annular seal 41 is interposed between the piezoelectric device 34 disposed along the outer perimeter of the rear surface of the dust-proof filter 33 and the dust-proof filter receiving part 38c to ensure hermetic sealing. In this way, the image pickup unit 30 has a hermetic structure that has the Y frame (holder) 38 having a desired size on which the CCD 31 is mounted.

Next, an anti-shake feature of the camera according to the present embodiment will be described.

In the present embodiment, it is supposed that the direction of the photographing optical axis is an O-axis direction, and the CCD 31, which is the image pickup device, is displaced in an X axis direction, which is a first direction in an XY plane perpendicular to the photographing optical axis, and the Y axis direction, which is a second direction perpendicular to the first direction in the XY plane, to compensate for a shake. The anti-vibration unit including the anti-shake driving apparatus uses, as a driving source, a transducer that produces an elliptic vibration on a driving part when a periodic voltage at a predetermined frequency is applied thereto and is intended to move the Y frame (holder) 38 in the image pickup unit 30 on which the CCD 31 is mounted.

First, an operation principle of the transducer used as the driving source in the driving apparatus according to the present embodiment will be described with reference to FIGS. 3A to 3D and 4.

FIGS. 3A to 3D are schematic diagrams for illustrating an operation principle of the transducer. FIG. 4 is a perspective view showing the transducer and a movable body to be driven.

Figure 3A:
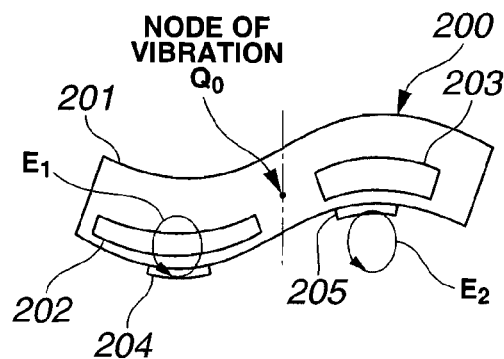
FIG. 3A is a schematic diagram for illustrating an operation principle of a transducer used in an anti-vibration unit of the camera shown in FIG. 1, showing a state where the transducer is bent during vibration.
Figure 3B:
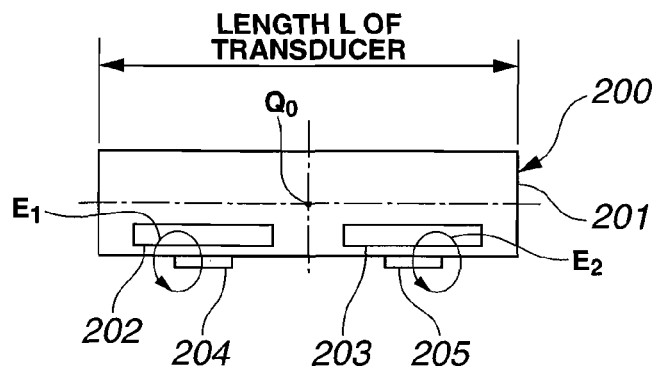
FIG. 3B is a schematic diagram for illustrating the operation principle of the transducer used in the anti-vibration unit of the camera shown in FIG. 1, showing a state where the transducer is expanded or shrunk during vibration.
Figure 4:
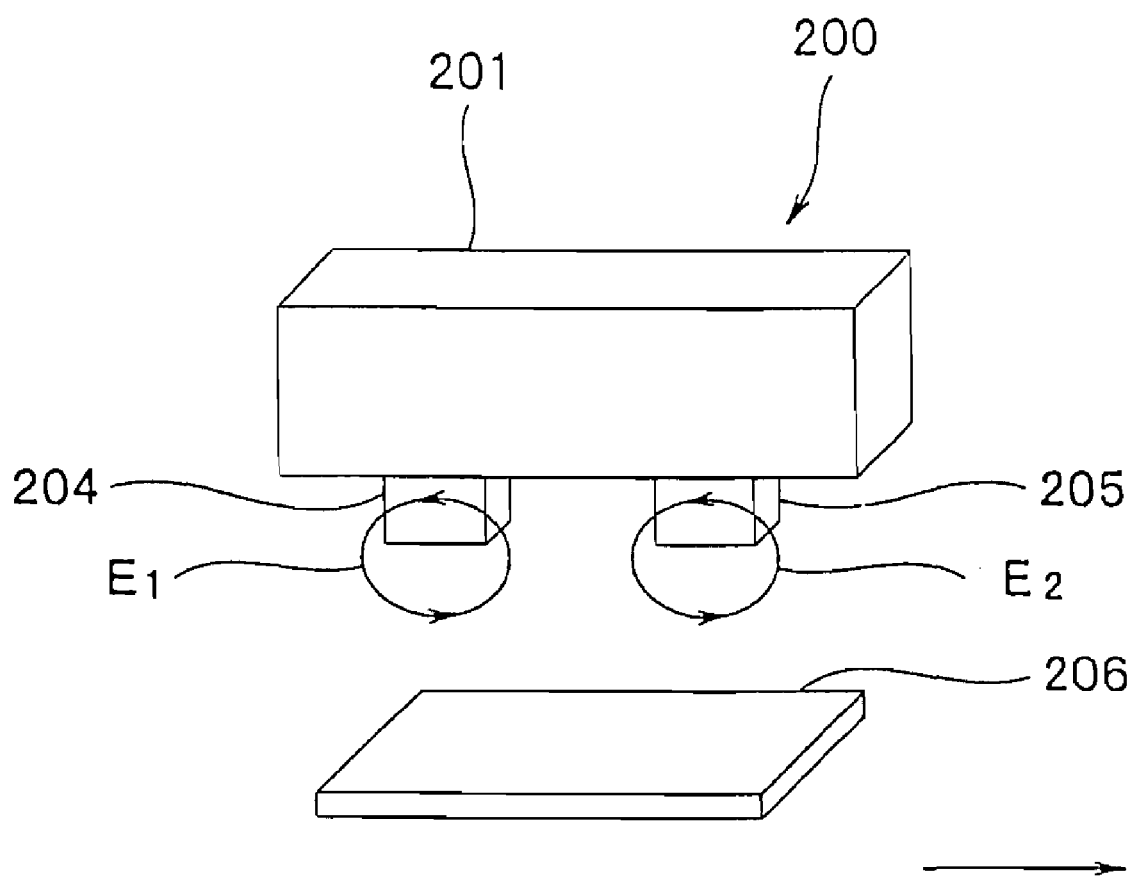
FIG. 4 is a perspective view of the transducer shown in FIG. 3A and a movable body to be driven.

A transducer 200 shown in FIGS. 3A and other drawings has a piezoelectric body 201 having a predetermined size and a rectangular shape, a pair of driving electrodes 202 and 203 disposed on the piezoelectric body 201 along the one side thereof symmetrically with respect to the midpoint thereof, and drivers 204 and 205 serving as driving parts disposed on the front surface of the piezoelectric body 201 at positions corresponding to those of the driving electrodes 202 and 203, respectively.

Figure 3C:
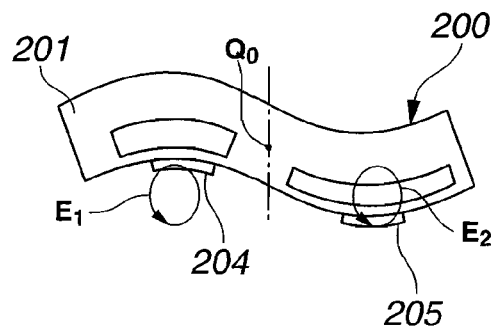
FIG. 3C is a schematic diagram for illustrating the operation principle of the transducer used in the anti-vibration unit of the camera shown in FIG. 1, showing a state where the transducer is bent during vibration.

When a positive voltage is applied to the driving electrode 202, as shown in FIG. 3A, a part of the piezoelectric body 201 on the front surface side, on which the driving electrode 202 is disposed, is deformed (expanded), whereas a part of the piezoelectric body 201 on the rear surface side is not deformed. Therefore, the half of the piezoelectric body 201 on which the driving electrode 202 is disposed is deformed into an arc shape. To the contrary, when a negative voltage is applied to the driving electrode 202, as shown in FIG. 3C, a part of the piezoelectric body 201 on the front surface side, on which the driving electrode 202 is disposed, is deformed (shrunk), whereas a part of the piezoelectric body 201 on the rear surface side is not shrunk. Therefore, the half of the piezoelectric body 201 on which the driving electrode 202 is disposed is deformed into a reversed arc shape. The same holds true for the half on which the driving electrode 203 is disposed.

To produce elliptic vibrations E1 and E2 on the surface of the drivers 204 and 205, respectively, a sinusoidal periodic voltage at a predetermined frequency is applied to the driving electrode 202 on one half of the polarized piezoelectric body 201, and a sinusoidal periodic voltage at the same frequency as, but out of phase with, the periodic voltage applied to the driving electrode 202 is applied to the driving electrode 203 on the other half.

Figure 3D:
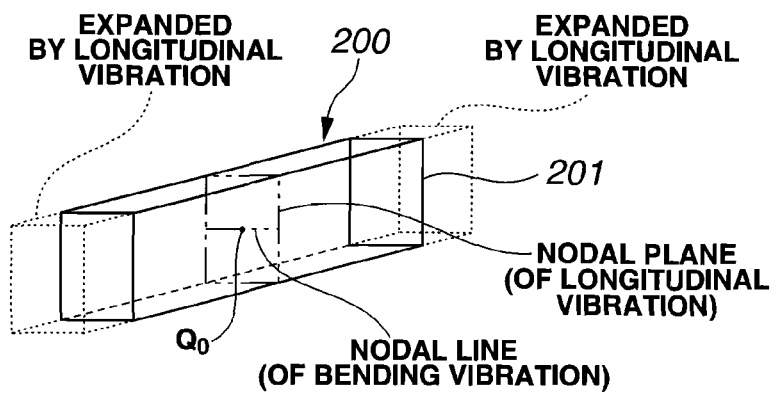
FIG. 3D is a schematic perspective view for illustrating the operation principle of the transducer used in the anti-vibration unit of the camera shown in FIG. 1, showing a state where the transducer is expanded during vibration.

The frequency of the applied periodic voltage is set at a predetermined value that provides a node Q0 of the bending vibration at the midpoint of the piezoelectric body 201 and antinodes of the bending vibration at the drivers 204 and 205, and a node of the longitudinal vibration (vibration of a rectangular parallelepiped to expand and shrink in the longitudinal direction as shown in FIG. 3D) of the piezoelectric body 201 that agrees with the node of the bending vibration. As the sign (+, −) of the periodic voltage at the predetermined frequency changes, the bending vibration of the transducer 200 involving the states shown in FIGS. 3A to 3C occurs, and elliptic vibrations occur on the surface of the drivers 204 and 205. If a movable body (movable member) 206 to be driven shown in FIG. 4 is pressed against the drivers 204 and 205 of the transducer 200, the movable body 206 moves in the direction of the elliptic vibrations E1 and E2 occurring on the surface of the drivers 204 and 205.

By changing the phase difference between the periodic voltages applied to the driving electrodes 202 and 203, the shape of the elliptic vibrations E1 and E2 occurring on the surface of the drivers 204 and 205 can be changed, thereby changing the speed of the movement of the movable body 206, which is driven by the transducer 200.

For example, if the phase difference between the periodic voltages is 0 degrees, the speed is 0. As the phase difference increases, the speed also increases. The speed is at the maximum when the phase difference is 90 degrees. If the phase difference increases beyond 90 degrees, the speed gradually decreases. When the phase difference is 180 degrees, the speed is 0 again. If the phase difference is negative, the direction of rotation of the elliptic vibrations E1 and E2 occurring on the drivers 204 and 205 is reversed, and therefore, the movable body is driven in the opposite direction. In this case also, the speed is at the maximum when the phase difference is −90 degrees.

Next, the anti-vibration unit according to the present embodiment using the transducer described above as a driving source will be described with reference to FIGS. 5 to 10.

Figure 5:
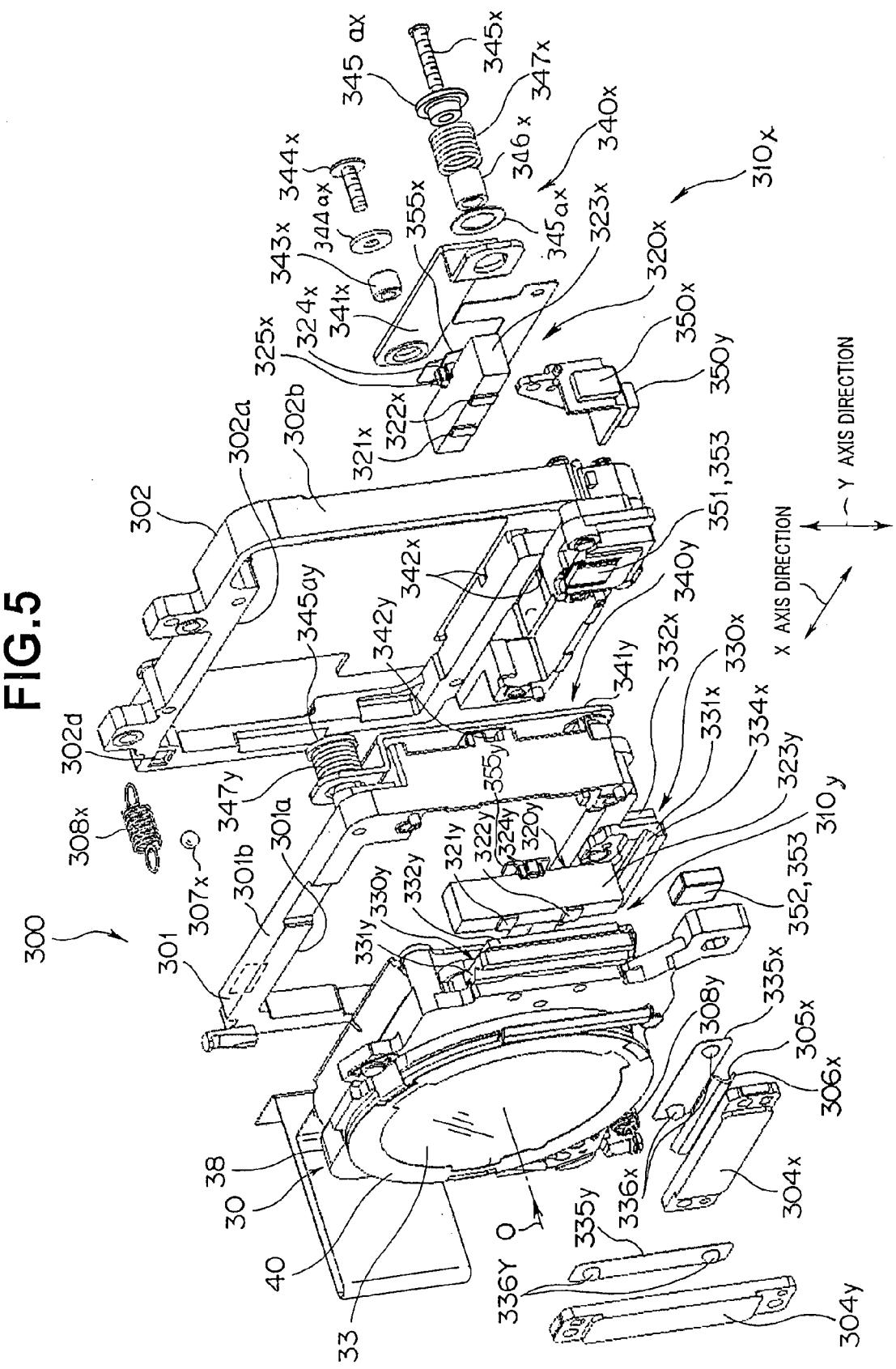
FIG. 5 is an exploded perspective view showing a configuration of the anti-vibration unit incorporated in the camera shown in FIG. 1.
Figure 6:
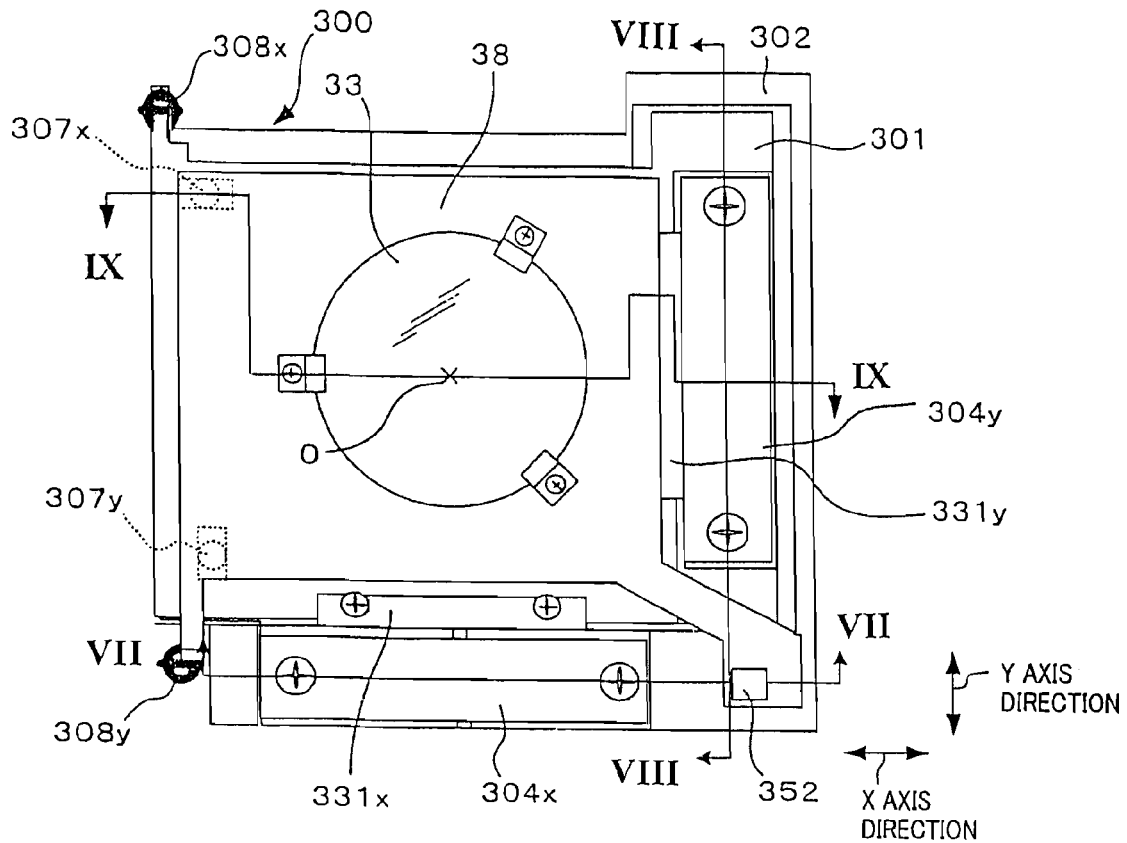
FIG. 6 is a simplified schematic diagram showing an arrangement of components of the anti-vibration unit shown in FIG. 5 viewed from the front thereof along a photographing optical axis.
Figure 7:
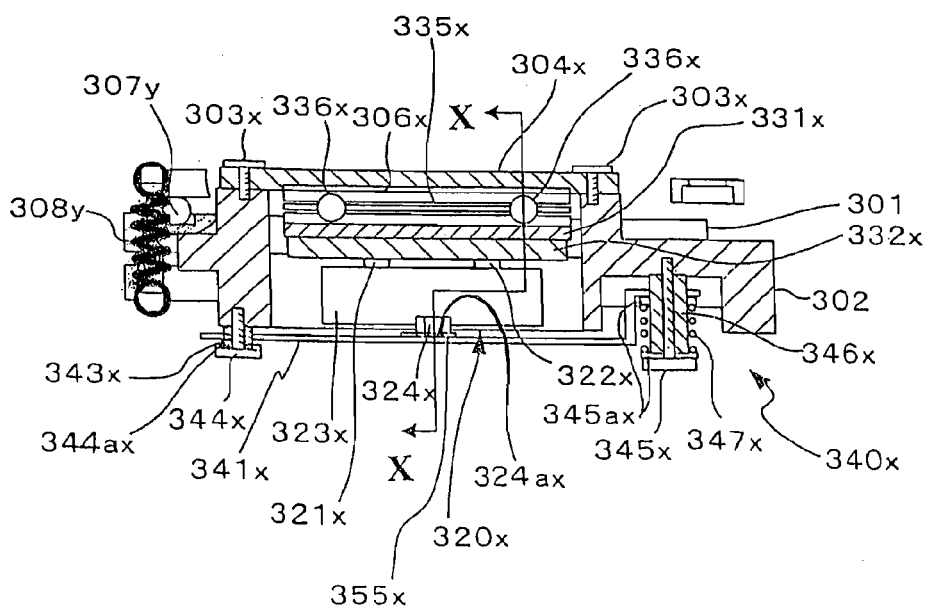
FIG. 7 is a cross-sectional view taken along the line VII-VII in FIG. 6.
Figure 8:
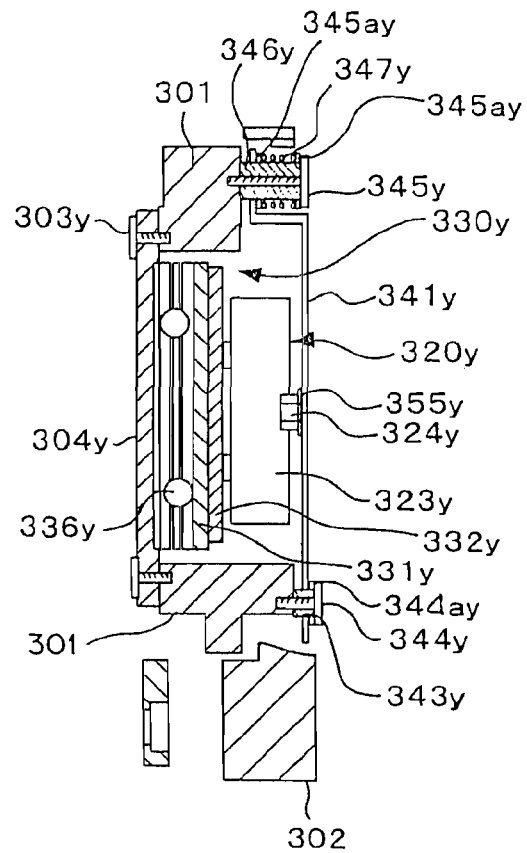
FIG. 8 is a cross-sectional view taken along the line VIII-VIII in FIG. 6.
Figure 9:
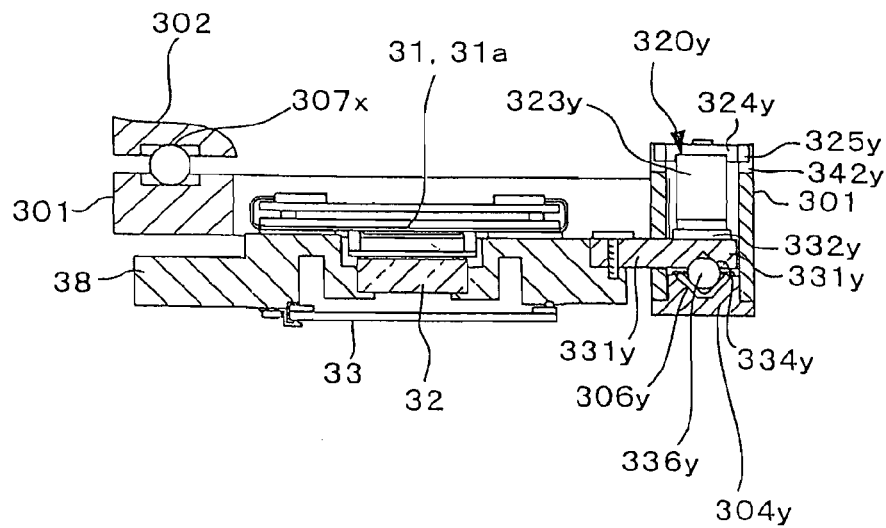
FIG. 9 is a cross-sectional view taken along the line IX-IX in FIG. 6.
Figure 10:
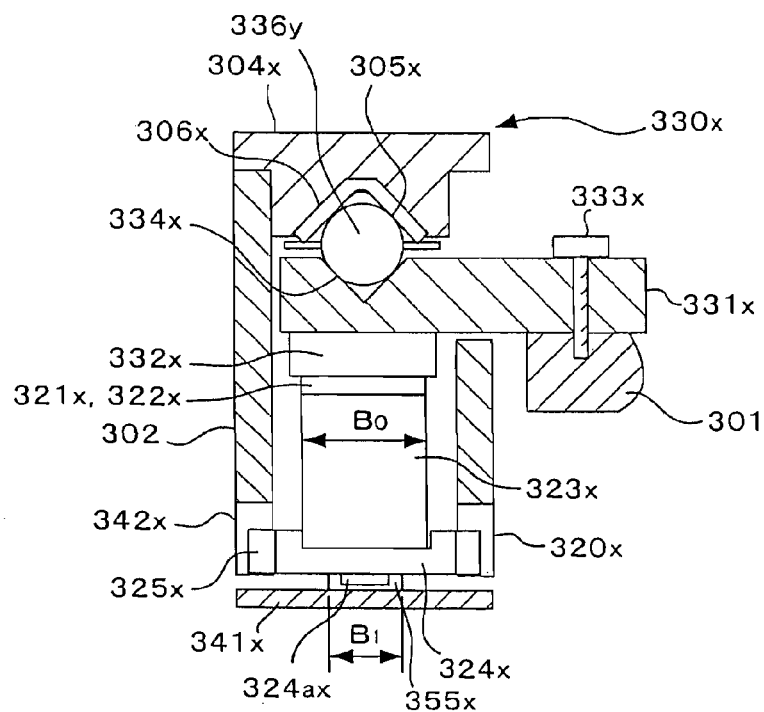
FIG. 10 is a cross-sectional view taken along the line X-X in FIG. 7.

FIG. 5 is an exploded perspective view showing a configuration of the anti-vibration unit according to the present embodiment. FIG. 6 is a simplified schematic diagram showing an arrangement of components of the anti-vibration unit shown in FIG. 5 viewed from the front thereof along the photographing optical axis. FIG. 7 is a cross-sectional view taken along the line VII-VII in FIG. 6. FIG. 8 is a cross-sectional view taken along the line VIII-VIII in FIG. 6. FIG. 9 is a cross-sectional view taken along the line IX-IX in FIG. 6. FIG. 10 is a cross-sectional view taken along the line X-X in FIG. 7.

Figure 11:
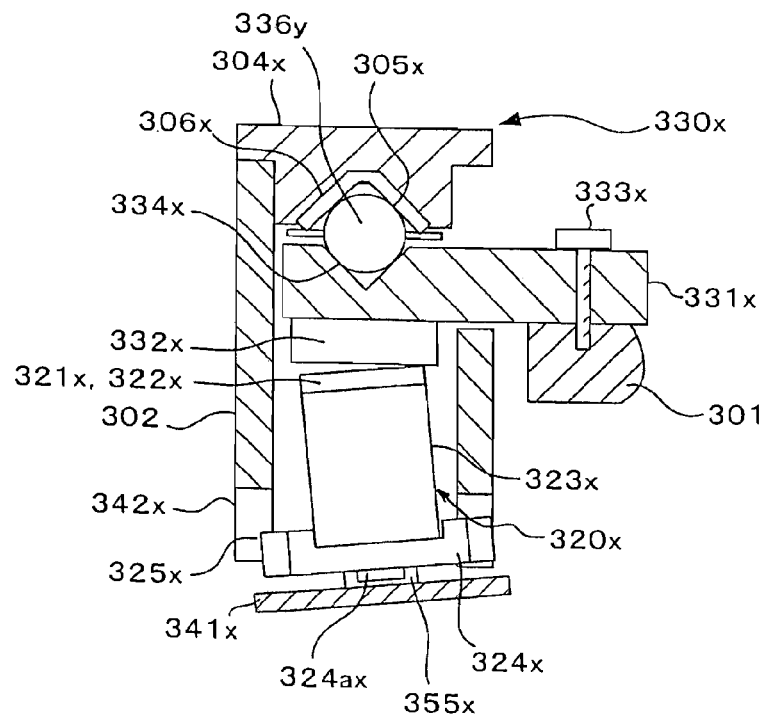
FIG. 11 is a cross-sectional view taken along the line X-X in FIG. 7 showing a state where a pressing plate of a pressing mechanism is slightly inclined with respect to a sliding plate, and accordingly the transducer is also inclined.
Figure 12:
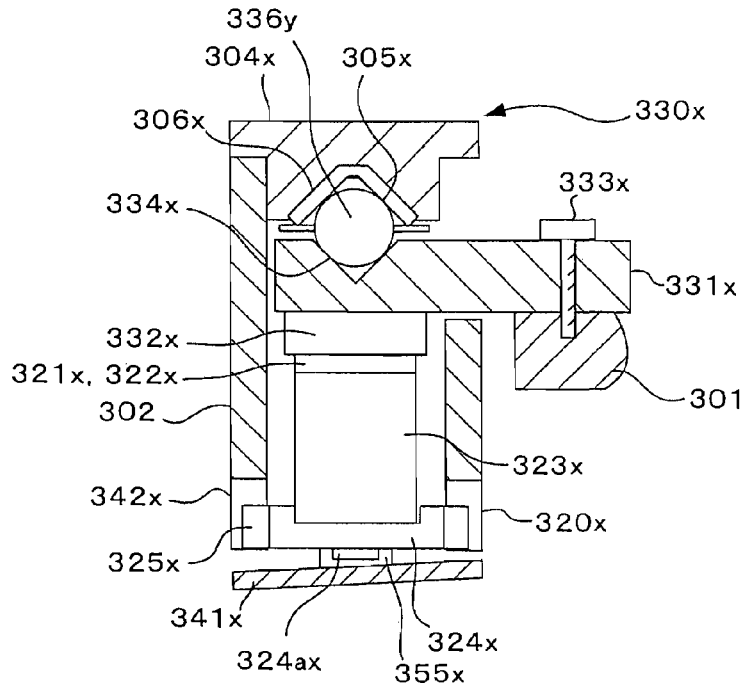
FIG. 12 is a cross-sectional view taken along the line X-X in FIG. 7 showing a state where the pressing plate of the pressing mechanism is slightly inclined with respect to the sliding plate, but the inclination of the transducer is corrected.

FIG. 11 is a cross-sectional view taken along the line X-X in FIG. 7 showing a state where a pressing plate of a pressing mechanism is slightly inclined with respect to a sliding plate, and accordingly the transducer is also inclined. FIG. 12 is a cross-sectional view taken along the line X-X in FIG. 7 showing a state where the pressing plate of the pressing mechanism is slightly inclined with respect to the sliding plate, but the inclination of the transducer is corrected.

The anti-vibration unit 300 according to the present embodiment is intended to eventually move the Y frame (second movable body, movable member) 38 serving as a holder on which the CCD 31 is mounted along with the optical LPF 32, the dust-proof filter 33 and the like in the X axis direction (first direction) and the Y axis direction (second direction). The anti-vibration unit 300 has an X frame (first movable body, movable member, or fixing/holding member with respect to the Y frame) 301 that has a frame part 301b surrounding an opening 301a formed around the photographing optical axis and has a desired size enough to accommodate the Y frame 38 movably in the Y axis direction and a frame (fixed member, holding member) 302 fixed to the camera main body (not shown) that has a frame part 302b surrounding an opening 302a formed around the photographing optical axis and has a desired size enough to accommodate the X frame 301 movably in the X axis direction.

The X axis direction and the Y axis direction are perpendicular to each other and perpendicularly intersect with the photographing optical axis (denoted by reference character O in the drawings).

In addition, the anti-vibration unit 300 has an X axis driving mechanism part 310x that displaces the X frame 301 with respect to the frame 302 in the X axis direction and a Y axis driving mechanism part 310y that displaces the Y frame 38 with respect to the X frame 301 in the Y axis direction. By displacing the Y frame 38 along with the X frame 301 with respect to the frame 302 in the X axis direction and with respect to the X frame 301 in the Y axis direction, the CCD 31 mounted on the Y frame 38 is displaced in the X axis direction and the Y axis direction in the XY plane to compensate for a shake.

Now, a configuration of the X axis driving mechanism part 310x will be described. The X axis driving mechanism part 310x has an X axis transducer (first transducer) 320x, a sliding body (first movable body part) 330x that is integrally fixed to the X frame 301 and to be driven along with the X frame 301, and a pressing mechanism (biasing mechanism) 340x that biases the X axis transducer 320x toward the sliding body 330x.

According to the operation principle of the transducer 200 described above with reference to FIGS. 3 and 4, the X axis transducer 320x has drivers (driving parts) 321x and 322x that are disposed on one surface of a rectangular piezoelectric body 323x and produce an elliptic vibration in response to application of a periodic voltage at a predetermined frequency.

The X axis transducer 320x further has a transducer holder (restricting member, pressing part) 324x at the middle of the surface of the piezoelectric body 323x opposite to the surface on which the drivers 321x and 322x are disposed. A protrusion 325x formed on the transducer holder 324x is fitted into a groove-like holding part 342x (first holding part) in the frame 302, and the X axis transducer 320x is thereby positioned and held so that the movement thereof in the X axis direction is restricted.

The transducer holder 324x has a central protrusion 324ax, which serves as a point of application of the force to press the transducer on the rear surface thereof (surface on the side of the pressing mechanism 340x). An anti-vibration sheet (vibration damping sheet) 355x is bonded to the central protrusion.

The width B1 of the anti-vibration sheet 355x (width in the direction perpendicular to the X axis direction, which is the direction of movement of the movable body) is smaller than the width B0 of the X axis transducer 320x on the sliding surfaces of the drivers 321x and 322x in the thickness direction thereof (direction perpendicular to the X axis direction), as shown in FIG. 10. The anti-vibration sheet 355x can be made of a material that absorbs vibrations, such as natural rubber, fluororubber, silicon rubber, butyl rubber, butadiene rubber, nitrile rubber, chloroprene rubber, ethylene propylene rubber, urethane rubber, foamed rubbers of the rubbers described above, felt, and cork.

The X axis transducer 320x is pressed toward the sliding body 330x by the pressing plate (pressing member) 341x of the pressing mechanism 340x described later with the anti-vibration sheet 355x and the transducer holder 324x interposed therebetween. A low friction material is applied to the surfaces of the anti-vibration sheet 355x and the pressing plate 341x in contact with each other. The low friction material can be grease having a coefficient of friction of about 0.025 such as a silicon-based grease, a fluorine-based grease and metal soap grease (lithium soap grease), oil such as mineral oil, silicon oil and a fluorine oil, or a solid lubricant such as molybdenum disulfide, fine graphite, diamond-like carbon, and polytetrafluoro ethylene (PTFE) fluorine coating.

With such a configuration, the driving force of the elliptic vibrations of the drivers 321x and 322x is applied to the sliding body 330x in the X axis direction.

The sliding body 330x has a bearing (guided part) 331x and a sliding plate (sliding part) 332x fixed thereto. The bearing 331x is integrally fixed, with a screw 333x, for example, to a part of the X frame 301 at a position where the drivers 321x and 322x of the X axis transducer 320x are pressed to come into contact with the sliding plate 332x. The sliding body 330x can be fixed to the X frame 301 in any manner, and an adhesive can be used instead of the screw.

As can be seen from FIG. 5, the sliding body 330x is smaller than the X frame 301 having a desired size. In other words, the sliding body 330x has a size similar to that of the X axis transducer 320x. In addition, whereas the X frame 301 is made of a material having low rigidity, such as resin and aluminum, the sliding plate 332x is made of a material having abrasion resistance and high rigidity, such as ceramics. The bearing 331x is made of a material that can be quenched to increase the rigidity, such as quenched ferritic stainless steel.

The frame 302 has a bearing (guiding part) 304x that is disposed in an attaching opening formed in the frame 302 and fixed to the frame 302 by a screw 303x to oppose the bearing 331x of the sliding body 330x. As shown in FIGS. 7 and 10, a V-grooved plate 306x for preventing wearing having a V-shaped groove 305x extending in the X axis direction is fixed to the bearing 304x. As shown in FIGS. 7 and 10, the bearing 331x has a V-shaped groove 334x that opposes the V-shaped groove 305x of the V-grooved plate 306x on the bearing 304x.

Two balls 336x (rolling bodies) positioned by a retainer 335x are interposed between the V-shaped grooves 305x and 334x. Thus, the bearings 304x and 331x have the two balls 336x arranged in a row in the X axis direction. As shown in FIG. 7 and other drawings, the two balls 336x are positioned slightly outwardly of the drivers 321x and 322x along the X axis, and the movement of the balls 336x in the X axis direction is restricted by the retainer 335x. The rolling bodies are not limited to the balls described above but can be rollers.

The pressing mechanism 340x has the pressing plate 341x for holding the X axis transducer 320x that is fixed to the frame 302 at one end thereof with a washer 344ax and a spacer 343x interposed therebetween, and a pressing spring 347x for biasing the pressing plate 341x that is disposed around a screw 345x that fixes the other end of the pressing plate 341x to the frame 302 with a washer 345ax and a spacer 346x interposed therebetween.

The biasing force of the pressing spring 347x applied to the pressing plate 341x is transferred to the drivers 321x and 322x of the X axis transducer 320x via the anti-vibration sheet 355x and the transducer holder 324x, and the drivers 321x and 322x are pressed against the sliding plate 332x by a predetermined force. The pressing force of the pressing mechanism 340x is considerably high and about 15 N (Newton).

If the pressing plate 341x is slightly inclined with respect to the sliding plate 332x in the cross section taken along the line X-X in FIG. 7, the drivers 321x and 322x are in contact with the sliding plate 332x only at one side thereof as shown in the cross-sectional view of FIG. 11, immediately after assembly. However, as described above since the width of the anti-vibration sheet 355x is smaller than the width of the X axis transducer 320x (and therefore the width of the drivers 321x and 322x), and the low friction material is applied to the surfaces of the pressing plate 341x and the anti-vibration sheet 355x in contact with each other as described above, if the X axis transducer 320x is driven to vibrate, the contact surfaces automatically relatively move with respect to each other to correct the posture of the X axis transducer 320x, and the posture of the drivers 321x and 322x in contact with the sliding plate 332x only at one side thereof is corrected as shown in the cross-sectional view of FIG. 12.

Figure 20:
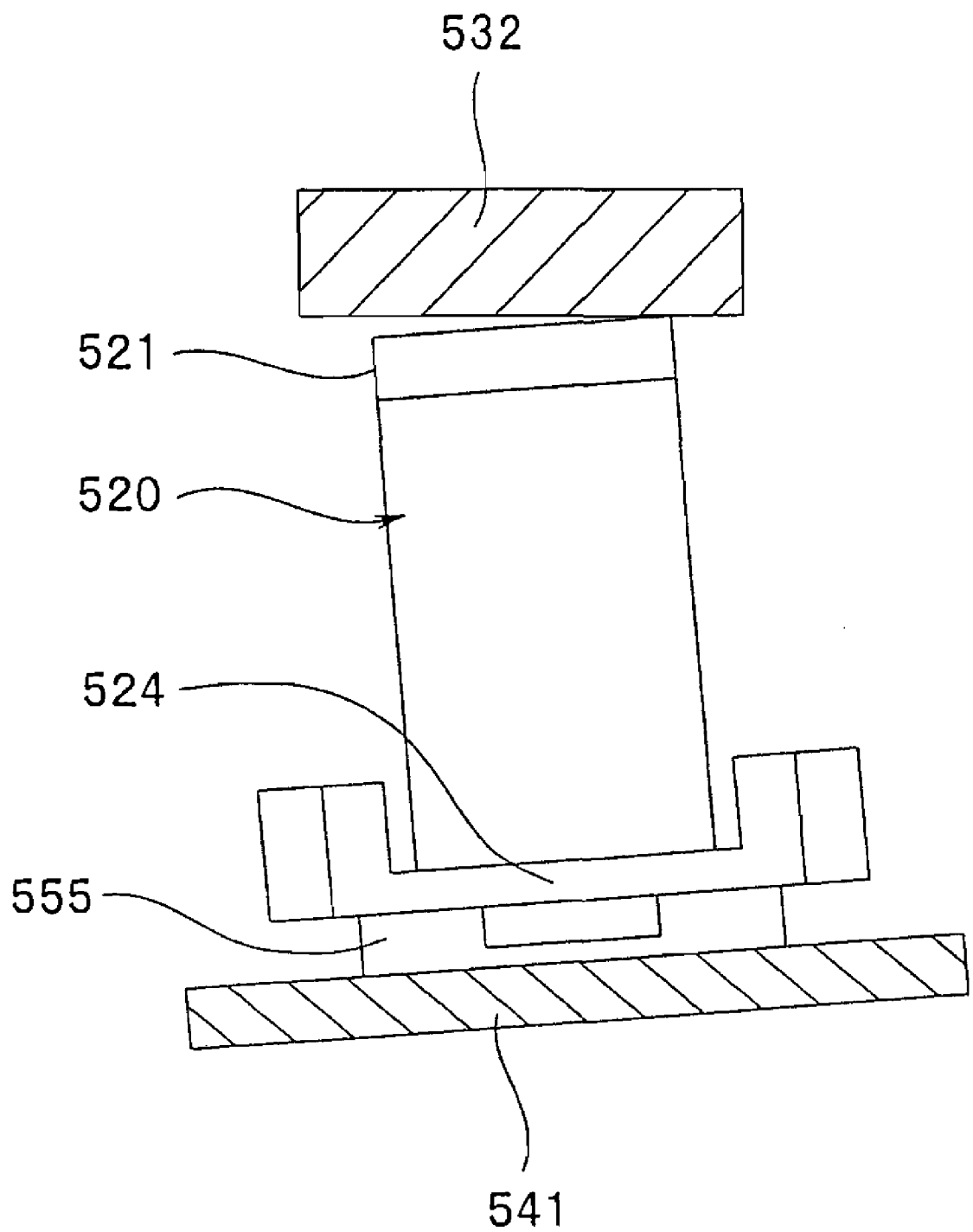
FIG. 20 is a cross-sectional view of a conventional driving apparatus taken along a plane perpendicular to the direction of movement of a movable body attached to a transducer.

FIG. 20 is a cross-sectional view of a driving apparatus, which is considered as an example of anti-shake feature using a conventional transducer, taken along a plane perpendicular to the direction of moment of a movable body attached to a transducer. As shown in FIG. 20, when the pressing plate 541 pressing the driver 521 of the transducer 520 against the movable body 532 and the movable body 532 are not adequately parallel to each other, if the vibration damping sheet 555 pressing the back surface of the transducer holder 524 is bonded to the pressing plate 541, and the width of the sheet in the thickness direction of the transducer 520 is larger than the width of the transducer 520, the driver 521 and the movable body 532 are in contact with each other only at one side of the driver 521 during driving. In such a case, power loss or audible noise is likely to occur.

However, according to the present embodiment, as described above, even if the pressing plate 341x is slightly inclined with respect to the sliding plate 332x, the posture of the transducer 320x is automatically corrected so that the drivers 321x and 322x are appropriately in contact with the sliding plate 332x. Therefore, occurrence of audible noise on the sliding plate 332x and reduction of the efficiency of transfer of the driving force can be prevented.

The bearing 331x can rotate about an axis passing through the center of the balls 336x and parallel to the V-shaped groove 334x. However, the bearing 331x is integrated with the X frame 301, and one ball (rolling body) 307x is disposed between the frame 302 and the X frame 301 at a position distant from the bearing 331x in a direction other than the X axis direction, specifically, at a substantially diagonal position on the frame part 302b farthest from the bearing 331x (FIG. 9).

The ball 307x is maintained in a pinched state in a groove 302d by the biasing force of a spring 308x engaged between the frame 302 and the X frame 301 in the vicinity of the ball 307x (FIG. 6) and positioned to maintain the distance of the X frame 301 from the frame 302 in the direction of the photographing optical axis (O-axis).

The biasing force of the spring 308x is required only to maintain the pinched state the ball 307x between the frame 302 and the X frame 301 and is set considerably lower than the biasing force of the pressing spring 347x. Thus, the X frame (movable body) 301 integrated with the sliding body (movable body part) 330x can move while being supported at three points on the frame 302 by the two balls 336x and one ball 307x.

Since the ball 307x and the balls 336x are disposed on the opposite sides of the photographing optical axis and the opening 301a, the distance between the ball 307x and the balls 336x increases, and therefore, a stable three-point supporting structure is provided.

As described above, according to the present embodiment, the three balls (rolling bodies) serve not only to guide the X frame (movable body) 301 in the direction of the movement thereof but also to determine the inclination of the X frame 301, and therefore stable driving can be achieved.

The Y axis driving mechanism part 310y has basically the same structure as the X axis driving mechanism part 310x. However, the X frame 301, in place of the frame 302, is a fixed member, and the Y frame 38 (second movable body), in place of the X frame 301, is to be moved. The Y axis driving mechanism part 310y has a Y axis transducer (second transducer) 320y, a sliding body (second movable body part) 330y that is integrally fixed to the Y frame 38 and is to be driven along with the Y frame 38, and a pressing mechanism (biasing mechanism) 340y that biases the Y axis transducer 320y toward the sliding body 330y.

In the following, differences between the Y axis driving mechanism part 310y and the X axis driving mechanism part 310x will be particularly described. The same or corresponding parts will be denoted by the same reference numerals with the suffix "y", and descriptions thereof will be omitted.

The Y axis driving mechanism part 310y differs from the X axis driving mechanism part 310x in thickness of the sliding plates 332x, 332y (material and the density of the sliding plates are the same). In the present embodiment, the sliding plate 332x of the X axis driving mechanism part 310x is thicker than the sliding plate 332y of the Y axis driving mechanism part 310y.

Since the bending rigidity (that is, the rigidity to bending vibration of the transducer) increases in proportion to the cube of the thickness, the bending rigidity of the sliding plate 332x is greater than that of the sliding plate 332y, and therefore, the rigidity of the sliding body 330y having the sliding plate 332y fixed to a bearing 331y is smaller than that of the sliding body 330x.

The reason why the sliding plate 332x of the X axis driving mechanism part 310x is thicker than the sliding plate 332y of the Y axis driving mechanism part 310y is because the X frame 301 driven by the X axis driving mechanism part 310x also holds the Y axis driving mechanism part 310y and has to produce a greater driving force, so that the amplitude of the vibration of the X axis transducer 320x is larger than that of the Y axis transducer 320y, and the rigidity has to be increased to reduce the vibration energy loss due to bending in response to application of the vibration to the sliding plate 332x.

In addition, the thicker sliding plate 332x adds to the rigidity of the sliding body 330x, and the fundamental frequency of bending of the sliding body 330x can be raised to prevent the frequency of the sliding body 330x from overlapping with the driving frequency of the X axis transducer, thereby preventing the vibration energy loss due to resonance of the sliding body 330x.

The fundamental frequency of bending of the sliding body 330x can be raised to achieve the same effect by forming the sliding bodies 330x and 330y including the sliding plates 332x and 332y of materials having different elastic moduli, rigidities or densities (for example, materials having different second moments of area with respect to the neutral axis of the sliding plate have different rigidities), rather than by forming the sliding bodies 330x and 330y including the sliding plates 332x and 332y having different thicknesses as described above.

The anti-vibration unit 300 according to the present embodiment has an X axis gyroscope 350x, which is a sensor that detects a shake of the body unit 100 about the X axis (shake in the pitch direction), and a Y axis gyroscope 350y, which is a sensor that detects a shake of the body unit 100 about the Y axis (shake in the yaw direction), in a main body part of the body unit 100.

In addition, the anti-vibration unit 300 has a position detecting sensor 353, which has a Hall device 351 disposed on the frame 302 and a magnet 352 disposed at a part of the Y frame 38 to oppose the Hall device 351. The anti-vibration unit 300 further has an anti-vibration controlling circuit 355 that controls a transducer driving circuit 354 for the X axis transducer 320x and the Y axis transducer 320y based on the signals from the X axis gyroscope 350x, the Y axis gyroscope 350y and the position detecting sensor 353. The anti-vibration controlling circuit 355 executes a control operation according to a command from the Bµcom 50.

Next, an operation of the X axis driving mechanism part 310x will be described with reference to FIGS. 13 to 17 and 18A to 18H.

Figure 13:
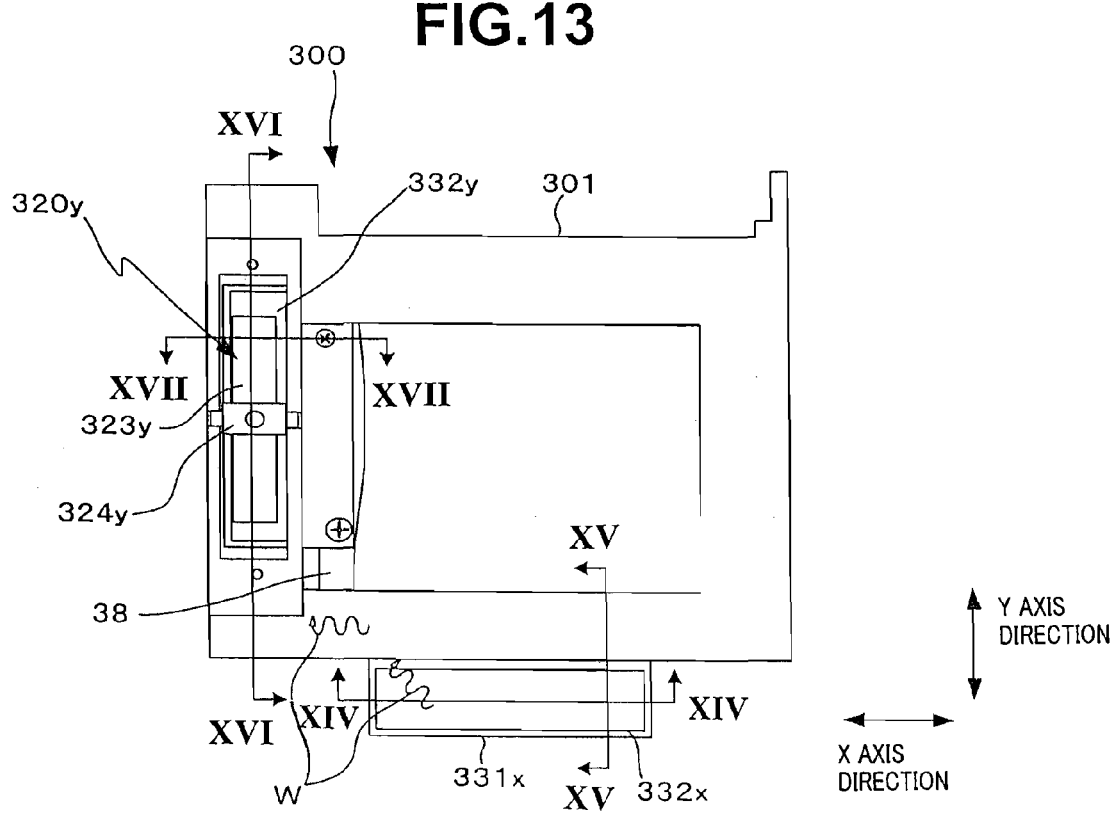
FIG. 13 is a simplified schematic diagram showing an arrangement of components of the anti-vibration unit shown in FIG. 5 viewed from the rear thereof along the photographing optical axis, showing transmission of a vibration of an X axis transducer to a Y axis transducer.
Figure 14:
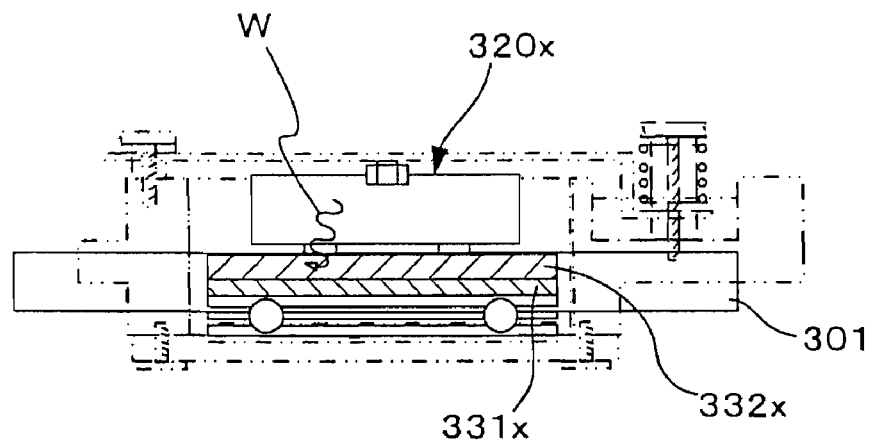
FIG. 14 is a cross-sectional view taken along the line XIV-XIV in FIG. 13.
Figure 15:
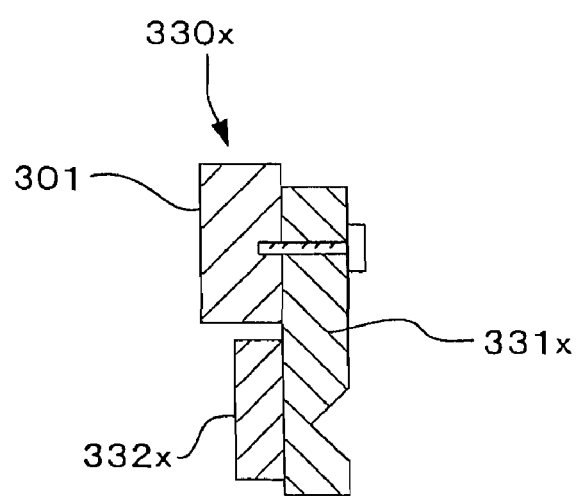
FIG. 15 is a cross-sectional view taken along the line XV-XV in FIG. 13.
Figure 16:
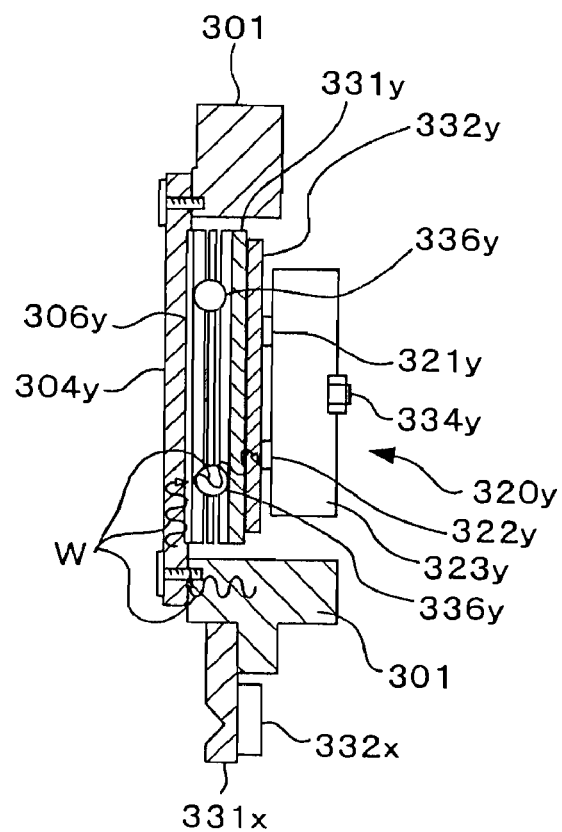
FIG. 16 is a cross-sectional view taken along the line XVI-XVI in FIG. 13.
Figure 17:
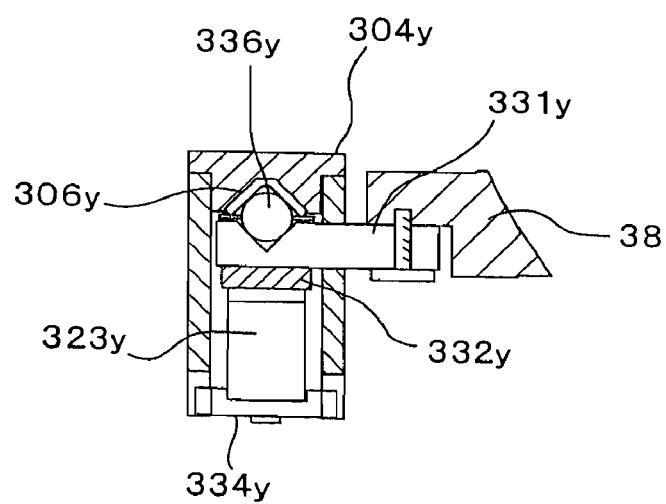
FIG. 17 is a cross-sectional view taken along the line XVII-XVII in FIG. 13.
Figure 18:
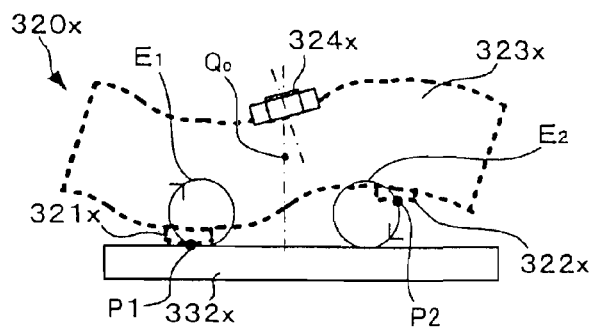
FIG. 18A is a diagram showing a state of the X axis transducer of an X axis driving mechanism part of the anti-vibration unit shown in FIG. 5 in which the X axis transducer is bent during vibration.
FIG. 18B is a diagram showing a state of the X axis transducer of the X axis driving mechanism part of the anti-vibration unit shown in FIG. 5 in which the X axis transducer is expanded during vibration, which occurs following the state shown in FIG. 18A.
FIG. 18C is a diagram showing a state of the X axis transducer of the X axis driving mechanism part of the anti-vibration unit shown in FIG. 5 in which the X axis transducer is bent during vibration, which occurs following the state shown in FIG. 18B.
FIG. 18D is a diagram showing a state of the X axis transducer of the X axis driving mechanism part of the anti-vibration unit shown in FIG. 5 in which the X axis transducer is bent during vibration, which occurs following the state shown in FIG. 18C.
FIG. 18E is a diagram showing a state of the X axis transducer of the X axis driving mechanism part of the anti-vibration unit shown in FIG. 5 in which the X axis transducer is bent during vibration, which occurs following the state shown in FIG. 18D.
FIG. 18F is a diagram showing a state of the X axis transducer of the X axis driving mechanism part of the anti-vibration unit shown in FIG. 5 in which the X axis transducer is shrunk during vibration, which occurs following the state shown in FIG. 18E.
FIG. 18G is a diagram showing a state of the X axis transducer of the X axis driving mechanism part of the anti-vibration unit shown in FIG. 5 in which the X axis transducer is bent during vibration, which occurs following the state shown in FIG. 18F.
FIG. 18H is a diagram showing a state of the X axis transducer of the X axis driving mechanism part of the anti-vibration unit shown in FIG. 5 in which the X axis transducer is bent during vibration, which occurs following the state shown in FIG. 18G.
Figure 18:
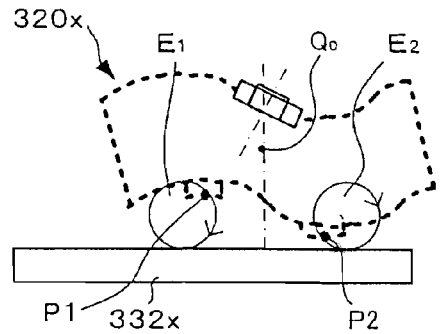
Figure 18:
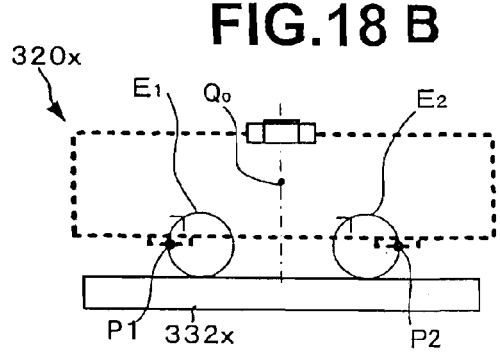
Figure 18:
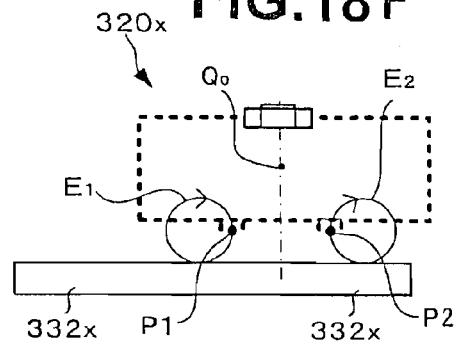
Figure 18:
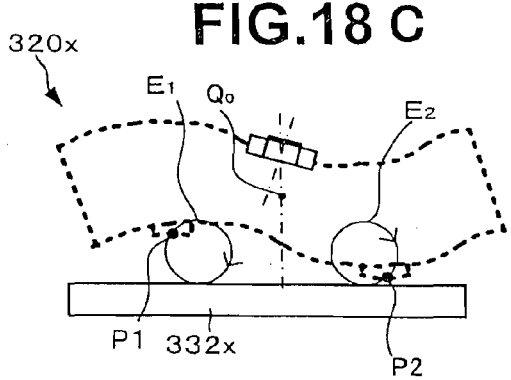
Figure 18:
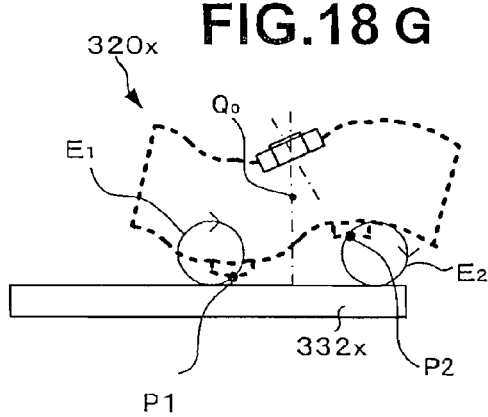
Figure 18:
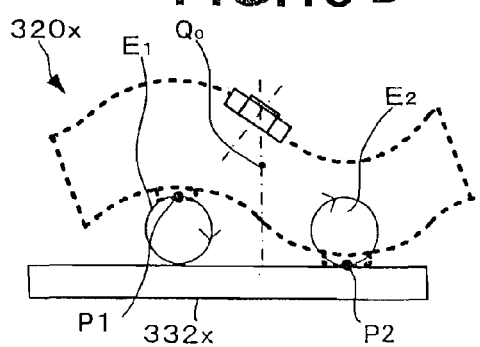
Figure 18:
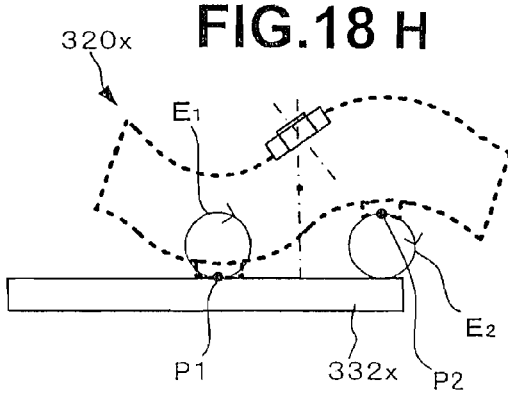

FIGS. 13 to 17 are diagrams for illustrating transmission of a vibration of the X axis transducer to the Y axis transducer. In particular, FIG. 13 is a diagram showing the anti-vibration unit viewed from the rear thereof along the photographing optical axis, FIG. 14 is a cross-sectional view taken along the line XIV-XIV in FIG. 13, FIG. 15 is a cross-sectional view taken along the line XV-XV in FIG. 13, FIG. 16 is a cross-sectional view taken along the line XVI-XVI in FIG. 13, and FIG. 17 is a cross-sectional view taken along the line XVII-XVII in FIG. 13. FIGS. 18A to 18H are diagrams showing various states of the X axis transducer of the X axis driving mechanism during vibration.

If a periodic voltage at a predetermined frequency is applied to the X axis transducer 320x to produce elliptic vibrations E1 and E2 on the drivers 321 x and 322x, the sliding body 330x is driven in the direction of rotation of the elliptic vibrations on the drivers 321x and 322x, since points of action P1 and P2 of the drivers 321x and 322x of the X axis transducer 320x are pressed against the sliding plate 332x by the strong biasing force of the pressing mechanism 340x.

For example, as shown in FIGS. 18A to 18H, the sliding plate 332x in contact with the drivers 321x and 322x in elliptic vibrations E1 and E2 moves leftward in the drawings. Of course, if the direction of the elliptic vibrations E1 and E2 is reversed, the sliding plate 332x move rightward in the drawings.

In this process, supposing that the resonance frequency of the X axis transducer 320x and the resonance frequency of the Y axis transducer 320y are substantially the same, and the sliding bodies have the same rigidity, the vibrational wave W of the X axis transducer 320x is transmitted to the Y axis transducer 320y through the sliding plate (sliding part) 332x, the bearing (guided part) 331x, the X frame 301, the bearing (guiding part) 304y, the V-grooved plate 306y, the balls 336y, the bearing (guided part) 331y, and the sliding plate (sliding part) 332y, as shown in FIGS. 13 to 17, which illustrate transmission of the vibration of the X axis transducer to the Y axis transducer.

Thus, a vibration resonant with the driving vibration of the X axis transducer 320x is likely to occur in a system including the vibration transmission path, so that the energy of the driving vibration of the X axis transducer 320x can be absorbed, the operation of the X axis driving mechanism part 310x can become unstable, or the X axis driving mechanism part 310x can fail to operate or resonate with the driving vibration to produce audible noise. In the case where the Y axis transducer 320y is driven, the vibration is transmitted through the path described above in the reverse direction, and the same problems arise.

However, according to the present embodiment, since the sliding plate 332x of the sliding body 330x is thicker than the sliding plate 332y, and therefore the sliding body 330x and the sliding body 330y differs in rigidity, the resonance frequency of the system including the vibration transmission path can be shifted from the frequency of the driving vibration, and therefore, unstable operation of the anti-vibration unit, power loss, or audible noise due to resonance can be prevented.

For example, if the thickness of both the sliding plate and the baring is doubled, the rigidity of the sliding body, which increases in proportion to the cube of the thickness, increases by 8 times, and the resonance frequency increases by two times. If a different material is used to increase the Young's modulus E by two times and decrease the density ρ to half, the resonance frequency, which is proportional to the square root of the Young's modulus divided by the density, increases by two times. In this case, if the Y axis transducer 320y is driven, the X axis driving mechanism part 310x does not resonate with the vibration of the Y axis transducer 320y, and therefore, unstable operation of the X axis driving mechanism part 310x, failure of operation of the X axis driving mechanism part 310x, or occurrence of audible noise can be prevented.

In addition, since the sliding body 330x and the bearing 331x has higher rigidity, the drivers 321x and 322x are stably in contact with the sliding plate 332x. As a result, the driving force of the elliptic vibrations is transmitted to the sliding plate 332x with reliability, and the sliding plate 332x is driven in the direction of rotation of the elliptic vibrations with high efficiency. In this process, since the surface of the sliding body 330x having the sliding plate 332x is not in surface contact with the frame 302 but in a rolling contact with the frame 302 via the balls 336x in the bearings 331x and 304x, the frictional force is low, and the sliding body 330x can relatively move with respect to the frame 302 with small friction with reliability even if high pressing force is applied thereto.

Since the bearings 331x and 304x form one linear ball bearing extending in the X axis direction, the sliding body 330x moves only in the X axis direction when the sliding body 330x is driven by the X axis transducer 320x. When the sliding body 330x moves in this way, the X frame 301 to which the sliding body 330x is fixed moves along with the sliding body 330x in the X axis direction. That is, the movement of the X frame 301 is also guided by the engagement of the bearings 331x and 304x forming one linear ball bearing extending in the X axis direction.

In such an operation, although the bearing 331x can rotate about an axis that passes through the center of the balls 336x and is parallel to the V-shaped groove 334x, the bearing 331x stably moves on the frame 302 in the X axis direction without being tilted about the axis parallel to the V-shaped groove 334x, because the bearing 331x is integrated with the X frame 301, and one ball 307x is disposed between the frame 302 and the X frame 301 at a position distant from the bearing 331x in a direction other than the X axis direction, so that the X frame 301 (movable body) having the sliding body 330x fixed thereto is supported on the frame 302 at three points by the two balls 336x and the one ball 307x.

Therefore, since the guiding and supporting mechanism that is strongly pressed against the X axis transducer 320x can be formed by the one linear ball bearing extending in the X axis direction formed by the bearings 331x and 304x, the structure can be downsized and simplified.

The Y axis driving mechanism part 310y operates in the same manner as the X axis driving mechanism part 310x.

Next, an anti-shake operation of the camera according to the present embodiment will be described.

When an anti-shake SW (not shown) in the camera operating SW group 52 is turned on, and a main SW (not shown) is turned on, the Bµcom 50 transmits a signal to instruct the transducer driving circuit 354 to conduct an initial operation to the anti-vibration controlling circuit 355, the transducer driving circuit 354 applies a periodic voltage at a predetermined frequency to the X axis transducer 320x and the Y axis transducer 320y, and the X frame 301 and the Y frame 38 are driven in the X axis direction and the Y axis direction so that the center of the CCD 31 is aligned with the photographing optical axis.

Then, the anti-vibration controlling circuit 355 acquires a signal indicative of a shake of the body unit 100 detected by the X axis gyroscope 350x and the Y axis gyroscope 350y.

Here, a signal outputted from an angular velocity sensor, which is indicative of a shake about one of the respective axes of the X axis gyroscope 350x and the Y axis gyroscope 350y, is amplified by a processing circuit, A/D-converted, and then inputted to the anti-vibration controlling circuit 355.

The anti-vibration controlling circuit 355 calculates a correction amount for the shake based on the output signal of the X axis gyroscope 350x and the Y axis gyroscope 350y and outputs a signal indicative of the calculated correction amount for the shake to the transducer driving circuit 354. The Y frame 38 with the CCD 31 mounted thereon and the X frame 301 are driven by the Y axis transducer 320y and the X axis transducer 320x that operate under the control of an electrical signal produced by the transducer driving circuit 354. The driven position of the CCD 31, that is, the position of the driven Y frame 38 is detected by the position detecting sensor 353, and the positional information is transmitted to the anti-vibration controlling circuit 355 for feedback control.

That is, the anti-vibration controlling circuit 355 calculates a reference value based on the signal inputted from the X axis gyroscope 350x and the Y axis gyroscope 350y (referred to as shake signal or shake angular velocity signal hereinafter). The calculation of the reference value is carried out in a period from turn-on of the main power supply of the camera until exposure for still image photographing. The reference value can be calculated in any method, such as a method of calculating an average movement value of the shake signal for a relatively long period and a method of calculating the DC component using a low pass filter having a relatively low cut-off frequency.

A low frequency component is removed from the shake signal by subtracting the calculated reference value from the shake signal. Based on the resulting signal and the output signal of the position detecting sensor 353, the transducer driving circuit 354 is controlled to move the CCD 31, that is, the Y frame 38 to compensate for the shake.

Next, an anti-shake operation of the camera according to the present embodiment conducted in still image photographing will be described with reference to FIG. 19.

Figure 19:
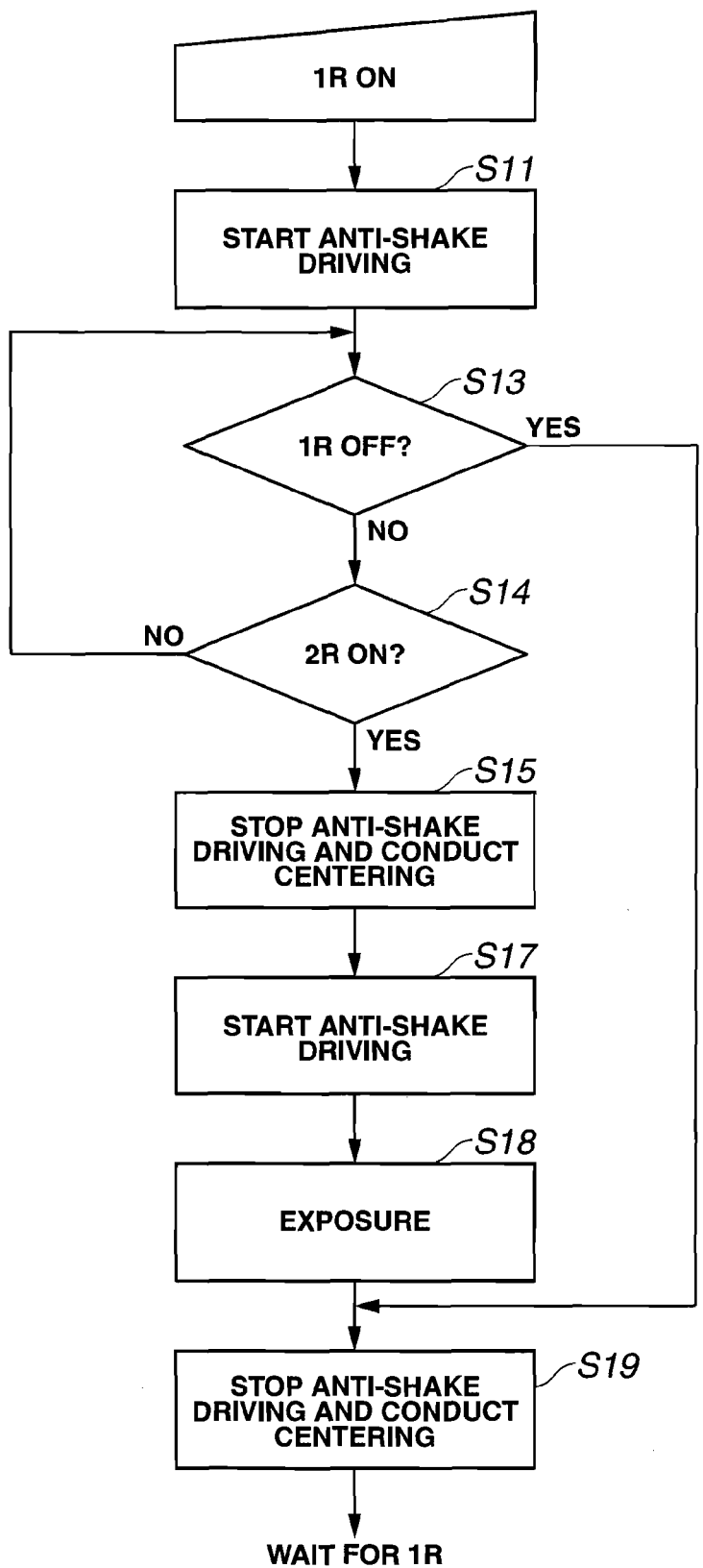
FIG. 19 is a schematic flow chart for illustrating an anti-shake operation of the camera shown in FIG. 1 conducted in still image photographing.

FIG. 19 is a schematic flow chart for illustrating an anti-shake operation conducted in still image photographing. The operation is not conducted before the release SW is operated to instruct start of preparation for photographing, that is, before a 1R operation, which is a first release operation of the release SW, occurs. The operation is started when the 1R operation is turned on, that is, when start of preparation for photographing is instructed.

Once the operation is started, the correction amount is calculated using the reference value described above, and an anti-shake driving is started based on the calculated correction amount (step S11). Then, it is determined whether or not the release SW is operated to instruct start of preparation for photographing, that is, the 1R operation is turned off (step S13). If it is determined that the 1R operation is released (if YES in step S13), the anti-shake driving started in step S11 is stopped, and the CCD 31 is centered (step S19), and the process returns to a state in which an instruction to start preparation for photographing is waited for (1R waiting state).

On the other hand, if it is determined that the instruction to start preparation for photographing entered via the release SW is not released (if NO in step S13), it is determined whether or not the release SW is operated to instruct start of photographing, that is, a 2R operation, which is a second release operation, is turned on (step S14). If it is determined that start of photographing is not instructed (if NO in step S14), the process returns to step S13 and waits for an instruction. If it is determined that start of photographing is instructed via the release SW (if YES in step S14), the anti-shake driving started in step S11 is stopped, and the CCD 31 is centered (step S15).

Then, the correction amount is calculated using the stored reference value, and the anti-shake driving is started based on the correction amount (step S17). Then, exposure is conducted (step S18). After exposure is completed, the anti-shake driving is stopped, and the CCD 31 is centered (step S19), and the process returns to the state in which an instruction to start preparation for photographing is waited for (1R waiting state).

As described above, the camera or, in other words, image pickup apparatus that incorporates the driving apparatus according to the present embodiment can efficiently and stably drive the Y frame holding the image pickup unit in response to a shake to compensate for the shake with higher reliability and can be downsized.

Even if the pressing plate 341x is slightly inclined with respect to the sliding plate 332x, the posture of the drivers 321x and 322x is corrected to avoid contact with the sliding plate 332x only at one side thereof with reliability. Therefore, occurrence of audible noise on the sliding plate 332x or reduction of the driving force transfer efficiency is suppressed.

The present invention is not limited to the embodiment described above, and various modifications can be made without departing from the spirit of the present invention in implementation of the present invention. Furthermore, the embodiment described above includes various phases of the present invention, and various inventions can be devised by appropriately combining a plurality of components disclosed in the present specification.

What is claimed is:

1. A driving apparatus, comprising:
   an actuator having a driver disposed on one surface of a piezoelectric device having a shape of a rectangular parallelepiped;
   a holding member that holds the actuator;
   a movable member that is moved on the holding member by the driver;
   a restricting member that restricts a position of the piezoelectric device with respect to the holding member;
   an anti-vibration sheet fixed to the restricting member; and
   a pressing member that presses the driver disposed on the actuator against the movable member with the restricting member and the anti-vibration sheet interposed therebetween,
   wherein the restricting member has a protrusion that serves as a point of application of a pressing force of the pressing member at a center part in a longitudinal direction of the piezoelectric device having the shape of a rectangular parallelepiped, the anti-vibration sheet is fixed to the restricting member to cover the protrusion, and a low friction material is interposed between the anti-vibration sheet and the pressing member in a vicinity of the protrusion.

2. The driving apparatus according to claim 1, wherein the low friction material is grease, or a fluorine resin coating applied to the anti-vibration sheet or the pressing member.

3. The driving apparatus according to claim 1, wherein a width of the anti-vibration sheet in a direction perpendicular to a longitudinal direction of the surface on which the driver is disposed is smaller than a width of the driver in the direction perpendicular to the longitudinal direction.

4. A driving apparatus, comprising:
   a transducer that produces an elliptic vibration on a driver in response to application of a periodic voltage at a predetermined frequency;
   a fixed member that has a holding part for holding the transducer; and
   a movable body that is driven and moved by the elliptic vibration of the transducer in a predetermined direction determined by a guiding part of the fixed member, the driver being pressed by a pressing member held by the fixed member pressing a pressing part of the transducer, wherein a vibration damping sheet is fixed to the pressing part, and a low friction material is interposed between the vibration damping sheet and the pressing part.

5. The driving apparatus according to claim 4, wherein the vibration damping sheet is fixed to the pressing part by an adhesive.

* * * * *